(12) United States Patent
Trichard

(10) Patent No.: US 6,505,860 B2
(45) Date of Patent: Jan. 14, 2003

(54) CONNECTION DEVICE FOR CONDUITS

(76) Inventor: Claude Trichard, 10, rue Clamont, 60480 Saint-Andre Farivillers (FR)

( * ) Notice: Subject to any disclaimer, the term of this patent is extended or adjusted under 35 U.S.C. 154(b) by 21 days.

(21) Appl. No.: 09/769,932

(22) Filed: Jan. 25, 2001

(65) Prior Publication Data

US 2001/0009332 A1 Jul. 26, 2001

Related U.S. Application Data

(63) Continuation-in-part of application No. 09/532,553, filed on Mar. 22, 2000, now abandoned.

(30) Foreign Application Priority Data

Jan. 26, 2000 (FR) .......................................... 00 01066

(51) Int. Cl.⁷ ................................................ F16L 17/00
(52) U.S. Cl. ........................ 285/104; 285/342; 285/343; 285/49
(58) Field of Search ................................ 285/104, 105, 285/108, 113, 40, 342, 343, 339, 34

(56) References Cited

U.S. PATENT DOCUMENTS

| | | | |
|---|---|---|---|
| 2,017,994 A | | 10/1935 | Spang |
| 3,815,940 A | * | 6/1974 | Luckenbill .................. 285/105 |
| 4,229,025 A | * | 10/1980 | Volgstadt et al. ........... 285/105 |
| 5,692,785 A | * | 12/1997 | Wartluft et al. ............. 285/105 |
| 5,947,532 A | * | 9/1999 | Lorenz ....................... 285/321 |
| 5,951,058 A | * | 9/1999 | Dickinson et al. .......... 285/104 |
| 6,129,391 A | * | 10/2000 | Rakieski .................... 285/337 |
| 6,142,538 A | * | 11/2000 | Volgstadt et al. ........... 285/323 |
| 6,145,893 A | * | 11/2000 | Kuo ........................... 137/356 |

FOREIGN PATENT DOCUMENTS

| | | |
|---|---|---|
| EP | 0 899 498 | 3/1999 |
| FR | 898.702 | 2/1962 |

* cited by examiner

Primary Examiner—Lynne H. Browne
Assistant Examiner—Aaron Dunwoody
(74) Attorney, Agent, or Firm—Cantor Colburn LLP

(57) ABSTRACT

A connection device for making a tight connection between two ends of tubes is provided. The connection device includes a body having two symmetrical and opposite portions for engaging ends of respective tubes, and each of the portions has a hooking element to keep the tube in the connection, and a sealing element for the connection. The hooking element of each portion includes: a truncated chamber arranged in each portion; a longitudinal rib projecting into the truncated chamber; and a split ring whose ends are located on either side of the longitudinal rib. The ring is provided with an internal threading, so as to cause a blocking of the tube by any traction on the tube in a direction opposite to its direction of engagement. The ring is placed free in the truncated chamber, on one hand, and is elastically deformable, on the other. The inner diameter of the ring is smaller than the outer diameter of the tube in an unstressed or deformed state, so as to deform elastically and to grip the tube upon introduction of the tube.

11 Claims, 3 Drawing Sheets

CONNECTION DEVICE FOR CONDUITS

CROSS REFERENCE TO RELATED APPLICATION

This application is a continuation-in-part of Application Ser. No. 09/532,553, filed on Mar. 22, 2000, now abandoned, the contents of which are herein incorporated by reference thereto.

This invention concerns the technical field of conduits, pipes or tubes, used to transport energy in electrical, optic or fluid form.

1. Technical Field of the Invention

Construction of such transportation networks, often subterranean or subaquatic, therefore requires the juxtaposition and connection of a whole series of elements, such as tubes to make a connection between two joints.

2. Description of the Related Art

Making a connection between two tubes imposes technical constraints associated on one hand with the special application (gas, telecommunications, . . . ) and, on the other hand, with the use of automatic machines for laying those tubes. The use of connection devices that resist strong traction, have compact dimensions and do not need a lot of connection time, so as not to immobilize the machinery too long, is therefore highly sought.

Connection devices are known that make it possible to connect tightly two ends of tubes, having an approximately cylindrical body and two symmetrical, opposing portions to engage the ends of the respective tubes, with each of the portions having hooking means to hold the tube in the connection, and sealing means for such connections; such hooking means on each portion contain:

- a truncated chamber arranged in each portion whose large base is located near the center of the device;
- a longitudinal rib that projects into the truncated chamber;
- and a split ring whose ends are located on either side of the longitudinal rib; said ring is provided with threads inside, and the outer form of said ring is chosen so that at least part of its peripheral surface is supported against the truncated chamber after the end of the tube is engaged to block the tube by any traction on said tube in the opposite direction from its direction of engagement.

However, these devices are not suitable for laying by machine, for example by encouraging blockages when being passed in guides. They also require complex tools to be dismantled on site, for example, to put a new cable in the tube.

Document US-A-2 017 894 also discloses a connection device for metal pipes in which a shrink ring is subject to the action of springs built into said device. The joint action of these springs and the narrow end of the device allows the metal ring to be encrusted in the metal pipes.

Such an embodiment, provided for special application to metal pipes, has an inconvenient design and is structurally complex, making it difficult and expensive to manufacture.

In addition, the stresses of tightening the ring are applied to the end of the connection device, thus embrittling the latter in the area near the narrowed parts.

In addition, tubes made of plastic material are generally wound before they are laid, generating great flexural stresses. These stresses have a tendency to deform and/or round the tubes, which makes them difficult or even impossible to assemble using a connection device.

SUMMARY OF THE INVENTION

The subject of this invention is a compact connection device, provided with a fast-hooking system for the tubes to be connected that can be dismantled without any specific tool.

Another goal of this invention is to create a connection device that can be adapted to a potential deformation or ovalization of the circular section of the tubes, and to ensure reliable, tight assembly.

According to the invention, in the type of connection device concerned, the ring is located in the truncated chamber and is deformable elastically, and the inner diameter of the ring is smaller than the outer diameter of the tube in the unstressed or deformed state of said ring, in such a way as to deform elastically and to grip the tube when inserted into said tube.

In another embodiment of the invention, the ring has grooves extending on part of its length starting from one end and distributed radially so as to form a radial tab on the side of the end between each pair of grooves.

In one preferred embodiment, the threading inside each ring has a sharp ridge that can be inserted in the periphery of the tube.

This design makes it easier to put each tube in the connector and improves the tube-ring connection, since it adds notching to the tightening exerted by the ring.

Advantageously, the threads inside the two rings have reverse pitches.

Thus, when the connection is made, the setting in rotation of the body in one direction, simultaneously with the engagement of the tubes in the rings sets the rings in rotation and favors the introduction of the threads of the rings in the wall of the tubes.

This arrangement is also interesting when dismantling the device, since by rotating the body in the opposite direction, it permits simultaneous longitudinal release toward the outside of the body of the two ends of the tube.

In one embodiment, the body has a circular central rib whose diametric faces form stop faces for the face at the end of each tube.

Thus, the engagement of each tube in the body is limited by the stop on the rib, and the contact with the stop informs the operator that he can terminate the connection by pulling the tubes toward the outside to cause additional tightening of the tubes by retracting the rings cooperating with the wall of the corresponding truncated chamber.

The invention also concerns a subterranean or subaquatic installation conduit having at least two installation tubes and at least one connection tube.

The advantage of the connection device in the invention is mainly its great structural simplicity and the reduced number of parts of which it is composed.

This increases the reliability of the device and reduces its cost.

BRIEF DESCRIPTION OF THE DRAWINGS

Other characteristics and advantages will emerge from the detailed description given below with reference to the attached drawing, which shows embodiments of the connection device in the invention, given as non-limiting examples, in which.

DETAILED DESCRIPTION OF THE PREFERRED EMBODIMENT

Figure 1:
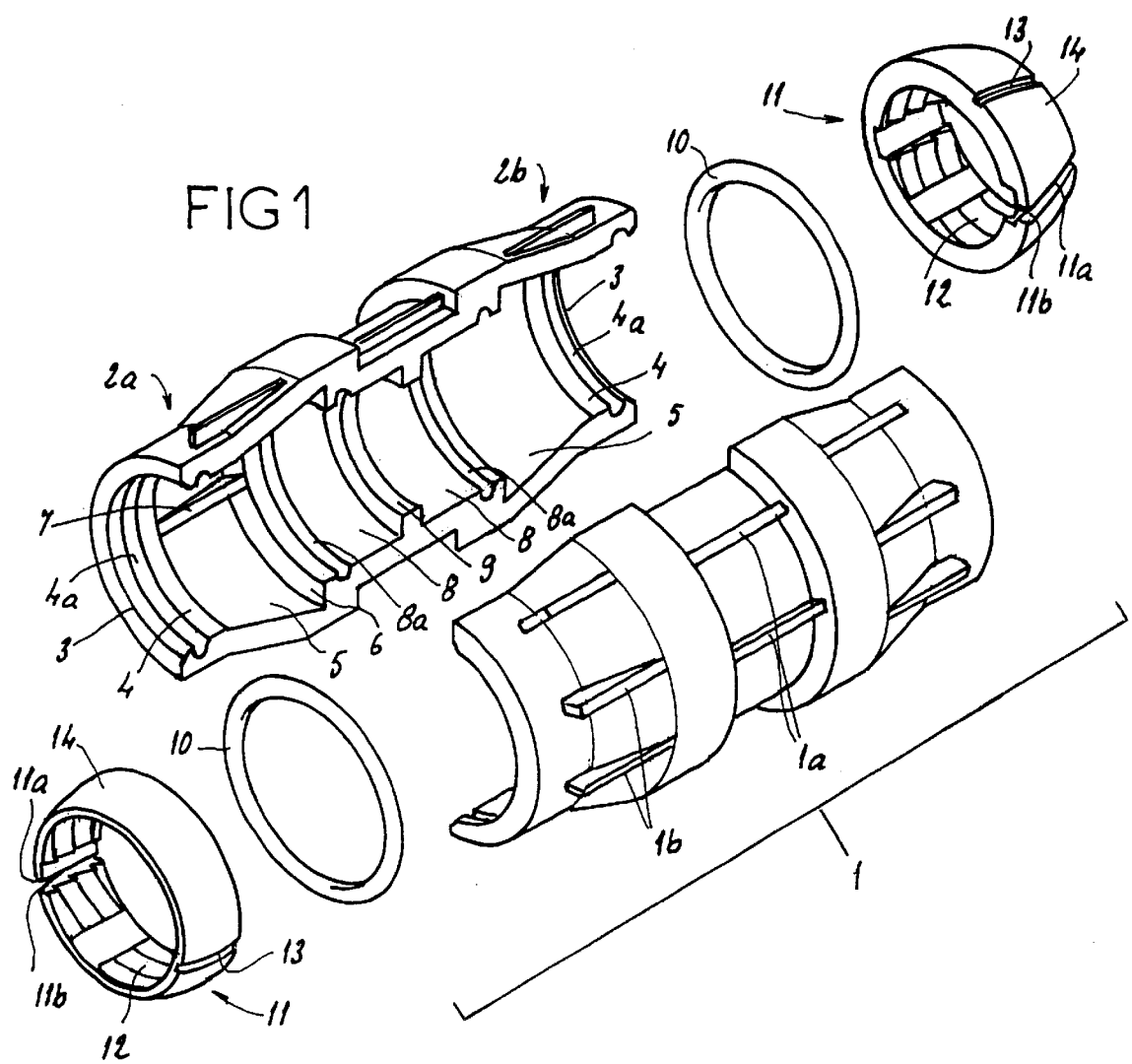
FIG. 1 is an exploded view of the connection device in the invention.

FIG. 1 shows a connection device in an exploded view. The connection device is composed of a main body 1 that is approximately cylindrical and has two portions 2a, 2b synmmetrical in relation to a plane orthogonal to the longitudinal axis of said main body 1. The first portion 2a, following the longitudinal axis from the outside to the central part of the connection device, has an entrance chamfer 3 and an external cylindrical span 4 in which a first circular groove 4a is arranged.

The first portion 2a extends through a truncated chamber 5 whose large base, partially delimited by a shoulder 6, is located toward the center of the connection device. A longitudinal rib 7 also projects to the interior of the truncated chamber 5.

The shoulder 6 then extends through a central cylindrical span in which a second circular groove 8a is also arranged. This central cylindrical span 8 ends with a circular central rib 9 separating the two portions 2a and 2b of the cylindrical body 1. The two portions 2a, 2b have a symmetrical configuration. The connection device in the invention also has toric joints 10 which fit into the internal grooves 4a and 8a. The connection device in the invention also has a split ring 11 located in each truncated chamber 5. Near the split, this split ring 11 has two opposite ends 11a, 11b, which are supported on the longitudinal rib 7, thus allowing said split ring 11 to slide longitudinally along said longitudinal rib 7 and to lock said split ring 11 in rotation in relation to the main body 1. The ring 11 is thus positioned free, along the longitudinal axis y-y' of the connection device, in the truncated chamber 5. Its position inside the truncated chamber 5 is determined only by the end of a tube 20, at the time of its movement in the direction of engagement or in the direction opposite the direction of engagement in the connection device. Rotation of the main body 1, or more specifically the connection device, thus also sets the split ring 11 in rotation. The latter can advantageously be extended by more or less pushing aside the ends 11a and 11b, as is the case when a tube 20 is inserted into the connection device and goes through the split ring 11.

For example, the split ring 11 is made with a plastic or metal material whose elasticity allows it, starting from a non-stressed or non-deformed state of the ring 11 in which its inner diameter is smaller than the outer diameter of the tubes 20, to deform elastically and to grip said tube 20 when it is inserted into said device.

Together, the truncated chamber 5, the longitudinal rib 7, an the split ring 11 comprise a hooking means which serves to hold the tube 20 in the connection device.

On the outside, the main body 1 can have external longitudinal ribs 1a, 1b designed to make the connection device easier to grasp and handle. This makes it easier to turn the connection device in the invention manually with or without a specific tool.

The body 1 advantageously has a particularly resistant central zone. This central zone, located between the truncated chambers 5, has an increased thickness, and the longitudinal external ribs la make it possible to reinforce the body 1, which can resist high pressures, for example on the order of 50 bar, in one given embodiment.

The split ring 11 has threads 12 on the inside with a diameter smaller than the outer diameter of the tubes 20 designed to be connected. The split rings 11 are thus supported on the tubes designed to be connected as soon as the latter are engaged in the connection device. The split rings 11, located in the truncated chambers 5 of portions 2a and 2b, respectively, have threads in the reverse direction.

The main body 1, since it is made, for example, by mirror soldering two half shells obtained for example by injection of plastic material, thus generates burrs along the joint plane of said half shells. So that these burrs do not interfere with the displacement of the split ring 11 in the truncated chamber 5, said split ring 11 is provided with two diametrically opposed longitudinal holes that are positioned on this joint plane so as to get rid of any potential tightening or jamming problem.

In one embodiment, the body 1 is composed of two identical molded half shells. For purposes of assembly, one of the half shells is pivoted 180° along an axis transverse to the longitudinal axis y-y' to form a second truncated chamber 5 with a longitudinal rib 7. Each half shell thus has only one longitudinal rib 7 (FIG. 1, for example).

The split ring 11 advantageously has a peripheral surface 14 whose shape is convex. This peripheral surface 11 has, for example, a spherical-type curve that allows said ring 11 to be tightened without getting jammed in the truncated chamber 5. Said split ring 11 is obviously tightened by longitudinal displacement of said split ring 11 along longitudinal rib 7, starting from the large conical base taking the form of the shoulder 6.

Figure 6:
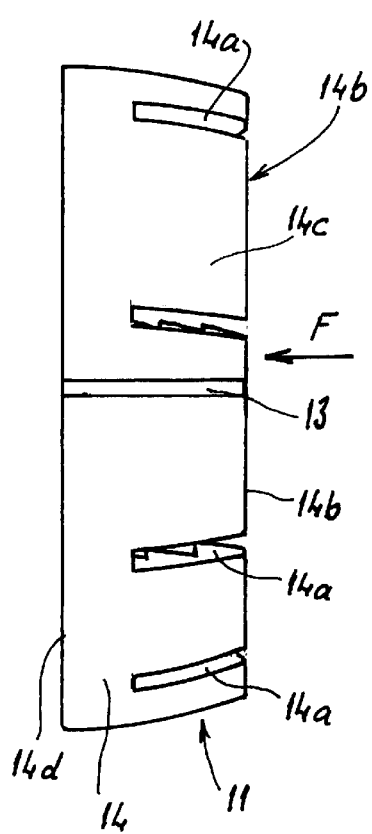
Figure 7:
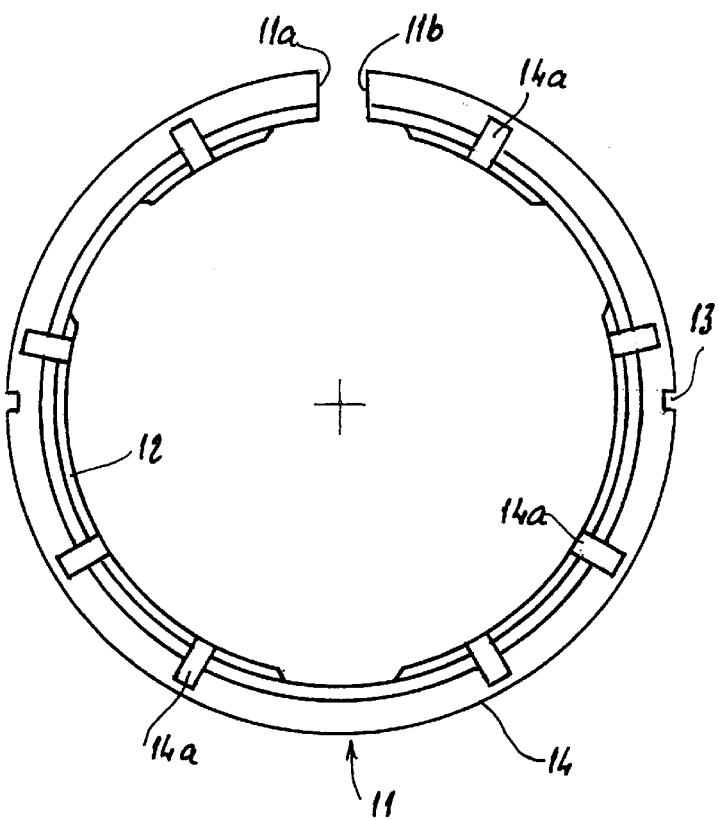

FIGS. 6 and 7 show another embodiment of the ring 11. FIG. 7 is a view along arrow F in FIG. 6. The ring 11 has longitudinal grooves 14a, extending over part of its length, starting from one end 14b. The grooves 14a completely traverse the radial thickness of the ring 11 and open to the outside on the end 14b. Grooves 14a are distributed radially in such a way as to delimit a group of radial tabs 14c on the side of end 14b. Each radial tab 14c is thus delimited by a pair of grooves 14a. Part of the length of ring 11 starting from the other end 14d, opposite end 14b, connects all the radial tabs 14c. Ring 11 can thus be perfectly adapted to slightly deformed or ovalized tubes, thanks to the presence of grooves 14a and radial tabs 14c. The latter thus make it easier to insert tube 20 into ring 11, particularly when said tube 20 has a section that is no longer perfectly circular.

Figure 2:
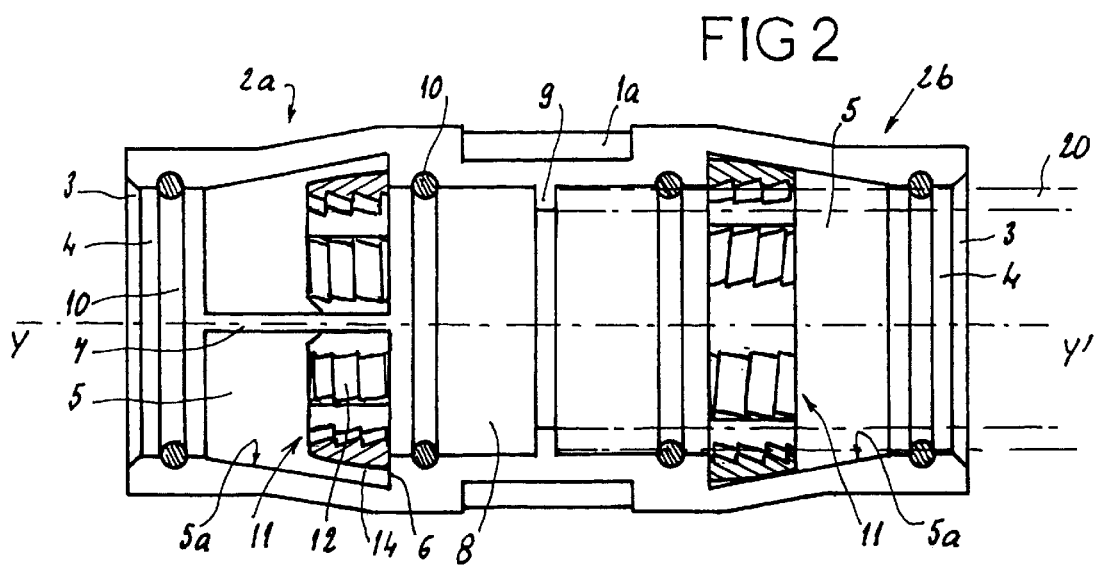
FIG. 2 is a longitudinal sectional view of the connection device in the invention.

FIG. 2 shows a sectional view of the connection device in the invention in which the split ring 11 on the left, that is the one located in portion 2a, is supported against shoulder 6 and on longitudinal rib 7. In portion 2b, the mixed line takes the form of a tube 20 engaged in the connection device and more specifically in portion 2b. Tube 20 is engaged and comes to stop against the shoulder that forms the central circular rib 9 and thus traverses the split ring 11. The latter is thus slightly pushed aside and rests on or comes close to the internal wall 5a of the truncated chamber 5. It is thus the exterior peripheral surface 14 of the split ring 11 that goes toward the cone formed by the truncated chamber. When tube 20 is inserted in the connection device, pushing aside the split ring 11 causes a priming or starting of encrustation of the internal threading 12 in the material of which said tube 20 is composed. The interior threading 12 of the split rings 11 has, for example, a section with sharp angles, the triangle/rectangle type, to form helicoidal notches that oppose any withdrawal of tube 20 when said internal threading 12 is encrusted in the periphery of said tube 20.

Figure 3:
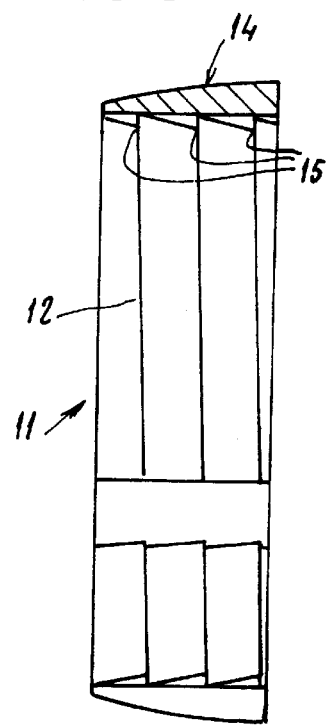
FIG. 3 shows an element in FIG. 2 enlarged.

An example of such internal threading 12 is shown in FIG. 3, for example.

Figure 4:
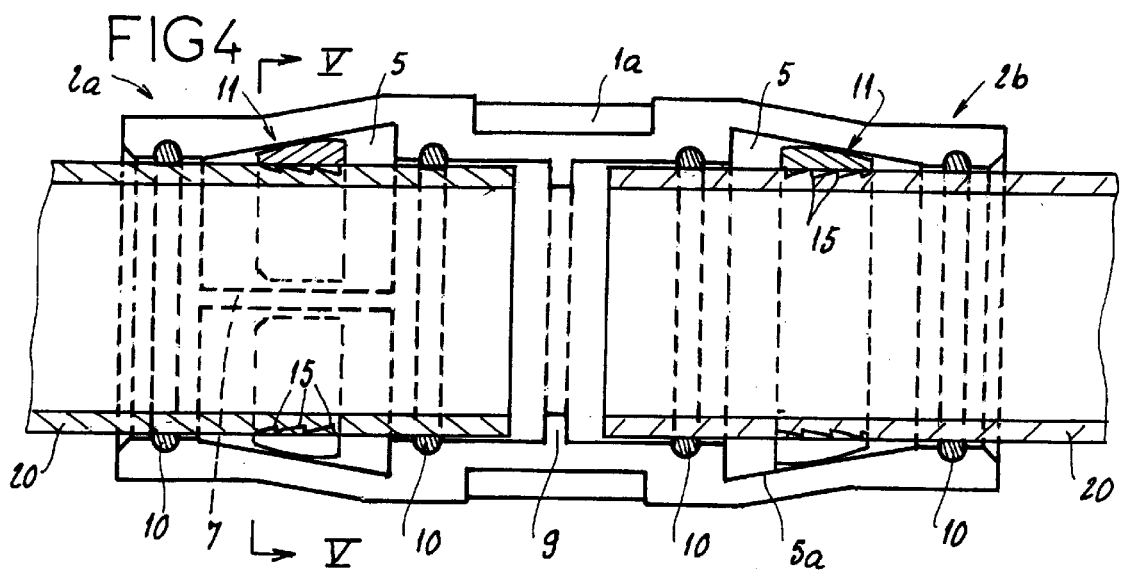
FIG. 4 is a view similar to FIG. 2 when the device connects two tube ends.

FIG. 4 shows a finished connection between two tubes 20 using the connection device. FIG. 4 shows a finished connection in which the tubes 20 are definitively immobilized using the connection device. A slight traction movement on each tube 20 makes it possible to move the split rings 11 to the outside, so they are re-tightened more around the tubes 20 by cooperation between the inner wall 5a of the truncated chambers 5 and the exterior surfaces 14.

This brings about an increased encrustation of the helicoidal notches 15 in the material of which the tubes 20 are composed and ultimately result in complete blockage of the ends of the tubes 20 in the connection device.

With the connection device in the invention, the ends of the tubes 20, after having been subjected to a slight withdrawal movement for locking (see FIG. 4), remain in the zone located between the truncated chambers 5, namely the reinforced zone.

Figure 5:
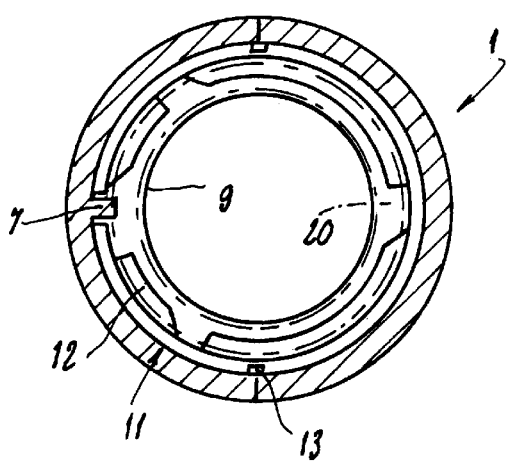
FIG. 5 is a partial sectional view along V—V in FIG. 4, FIGS. 6 and 7 are profile and front views, respectively, of another embodiment of a ring in the connection device in the invention.

FIG. 5 shows a sectional view along line V—V in FIG. 4.

Two tubes 20 are thus connected by fitting the ends of said tubes 20 together, parallel to the longitudinal axis y–y' (see FIG. 2). They are made to stop against the central circular rib 9 by rotating the main body 1 in the direction opposite the one for uncoupling. This is done by making a rotational movement on the main body 1 to gradually release the ends of the tubes 20 from the internal threads 12. This is possible because of the longitudinal ribs 7, which make it possible to set the split rings 11 in rotation. The ends of the tubes 20 are thus simultaneously pushed toward the exterior of the connection device. They are completely uncoupled after a number of rotations of the body 1, due to the internal threading 12 in the opposite direction of the two split rings 11.

The connection device is connected to the ends of tube 20 by engaging each end in the corresponding ring 11, potentially with relative rotation of the tube 20 in relation to the ring 11, then, at the end of the engagement, by exerting traction on tube 20 to displace ring 11 in its truncated chamber 5 and bring about additional tightening on tube 20.

The connection device in the invention has applications for connecting a tube made of a plastic material, for example, HDPE, PP or PVC. The connection device in the invention has the advantage of being able to be dismantled without any specific tool. Manual dismantling is conceivable with no problem. In addition, no specific preparation of the ends of tubes 20 is necessary to connect them. The connection device also has great mechanical resistance without increasing its space requirements. The use of an automatic positioning machine is therefore fully indicated.

The connection device in the invention is also interesting, because the two tubes 20 are connected extremely quickly, without changing the reliability of such a connection. Indeed, the presence of the central circular rib 9 makes it possible to indicate to the user of such a connection how far it is necessary to insert the ends of the tubes 20 to obtain a satisfactory connection. The ends of the tubes 20 are consequently engaged up to the stop on said ends against the central circular rib 9.

In addition, the longitudinal cylindrical spans 4 and 8 make possible longitudinal guidance of the tubes 20, and their relatively large dimensions make it possible to provide a seal, even with the high radii of curvature to which the unit composed of tubes 20 and the connection device can be subject. The joints 10, for example toric joints, make it possible to provide that seal in cooperation with spans 1 and 8.

In particular, joint 10, housed in the circular groove la of the external span 4, makes it possible to obtain gradual radii of curvature for the tubes 20 connected, by preserving the seal and delaying the appearance of the "scaling effect" for said tubes 20.

The shape of the connection device and, more specifically, the tapering shape of the body 1 also make it possible to use it in a strand of tubes, which is particularly advantageous.

It is therefore not difficult to conceive of using it on single- and multi-tube plowing machines.

What is claimed is:

1. A connection device comprising:
   a body that is approximately cylindrical and has two symmetrical, opposite portions for an engagement of two tube ends, each of the portions having a hooking means to hold the tube in the connection, and a sealing means for the connection, the hooking means of each portion including:
   a truncated chamber arranged in each portion having a large base located near a center of the device;
   a longitudinal rib projecting into the truncated chamber; and
   a split ring having ends located on either side of the longitudinal rib, the ring having an internal threading, and an outer shape of the ring being chosen so that at least one part of its peripheral surface is supported against the truncated chamber after the engagement of the end of the tube, so as to block the tube by any traction on the tube in a direction opposite to a direction of engagement of the tube;
   wherein the ring is positioned free in the truncated chamber and is elastically deformable and an interior diameter of the ring is smaller than an exterior diameter of the tube in an unstressed or deformed state of the ring, so as to deform elastically and grip the tube at the time the tube is inserted.

2. The connection device in claim 1, wherein the rings have reverse pitches.

3. The connection device in claim 1, wherein the internal threading on each ring has a sharp ridge that can be inserted into a periphery of the tube.

4. The connection device in claim 1, wherein the body has a central circular rib having diametric faces forming stop faces for the face at the end of each tube.

5. The connection device in claim 1, wherein each portion of the body has a cylindrical span with a respective circular groove for a joint upstream and downstream from the truncated chamber.

6. The connection device in claim 3, wherein the internal threading has a sharp ridge to form helicoidal notches opposing any withdrawal of the tube.

7. The connection device in claim 1, wherein the peripheral surface of the ring coming in contact with the truncated chamber is convex.

8. The connection device in claim 1, wherein the body is composed of two half shells assembled by soldering along a diametrical plane after rings are put into the truncated chambers.

9. The connection device in claim 1, wherein the body has a tapered exterior shape and has a central groove in which longitudinal notches are arranged to set the body in rotation, if necessary with a tool.

10. The connection device in claim 1, wherein the ring has grooves extending over part of its length, starting from one end and distributed radially so as to delimit a radial tab between each pair of grooves on the side of the end.

11. A subterranean or subaquatic installation conduit having at least two installation tubes and at least one connection device according to claim 1.

* * * * *